US012389158B2

(12) United States Patent
Li et al.

(10) Patent No.: US 12,389,158 B2
(45) Date of Patent: Aug. 12, 2025

(54) SPEAKER MODULE AND ELECTRONIC DEVICE

(71) Applicants: QISDA (SUZHOU) CO., Ltd., Suzhou (CN); QISDA OPTRONICS (SUZHOU) CO., LTD., Suzhou (CN)

(72) Inventors: Guangpeng Li, Suzhou (CN); Wenguang Hao, Suzhou (CN)

(73) Assignees: QISDA (SUZHOU) CO., Ltd., Suzhou (CN); QISDA OPTRONICS (SUZHOU) CO., LTD., Suzhou (CN)

( * ) Notice: Subject to any disclaimer, the term of this patent is extended or adjusted under 35 U.S.C. 154(b) by 222 days.

(21) Appl. No.: 18/218,609

(22) Filed: Jul. 6, 2023

(65) Prior Publication Data

US 2024/0348973 A1 Oct. 17, 2024

(30) Foreign Application Priority Data

Apr. 14, 2023 (CN) ......................... 202310396884.6

(51) Int. Cl.
*H04R 1/28* (2006.01)
*H04R 1/02* (2006.01)

(52) U.S. Cl.
CPC ........... *H04R 1/2896* (2013.01); *H04R 1/025* (2013.01); *H04R 1/028* (2013.01); *H04R 2400/11* (2013.01)

(58) Field of Classification Search
CPC ...... H04R 1/2896; H04R 1/025; H04R 1/028; H04R 1/02; H04R 2400/11; H04R 2499/11; H04R 2499/15; H04R 9/06
USPC .................................. 381/332, 333, 334, 87
See application file for complete search history.

(56) References Cited

U.S. PATENT DOCUMENTS

2021/0176559 A1* 6/2021 Shen ...................... H04R 1/026

FOREIGN PATENT DOCUMENTS

DE 202023106523 U1 * 4/2024 ............ F16F 1/3732

* cited by examiner

*Primary Examiner* — Ahmad F. Matar
*Assistant Examiner* — Sabrina Diaz
(74) *Attorney, Agent, or Firm* — Winston Hsu

(57) ABSTRACT

A speaker module includes a device casing, a speaker, a fixing structure, and a cushion unit. The fixing structure includes first, second and third fixing parts. The first fixing part is fixedly disposed on the device casing. The second fixing part is fixedly connected with the speaker. The cushion unit includes a cushion body and a plurality of positioning protrusions. The cushion body has a through hole, a first end surface, and a second end surface opposite to the first end surface. The positioning protrusions are disposed on the second end surface. Therein, the cushion body prevents the first fixing part and the second fixing part from directly touching each other. An electronic device has the above speaker module.

16 Claims, 4 Drawing Sheets

SPEAKER MODULE AND ELECTRONIC DEVICE

BACKGROUND OF THE INVENTION

1. Field of the Invention

The present invention relates to an electronic device, and more particularly to a speaker module and an electronic device therewith.

2. Description of the Prior Art

Common electronic devices can play sound through speakers (such as speakers, stereos, etc.). With the advancement of technology, today's consumers pay more and more attention to the quality and enjoyment of life, and have higher and higher requirements for the sound quality of the speakers. Taking projectors as an example, as consumers have higher and higher requirements for the quality of electronic products, projectors are gradually adding speakers with good sound quality. The size of the speakers is getting bigger and bigger, and the amplitude is also getting higher and higher As a result, upgrading the projector with the rest of the components unchanged will cause a series of adverse reactions, such as resonance causing picture jitter. Take a notebook as an example, because the speaker (or horn) will vibrate when it makes a sound, the vibration will be transmitted to other parts of the device through the casing. The device contains a mechanical hard disk and an optical drive, both with motors. When the speaker vibrates and sounds, it may resonate with the hard disk and the optical drive, causing problems with the readings of the hard disk and the optical drive, which affects the operation of the programs.

At present, the most common way is to install the speaker on the device casing through a silicone sleeve. However, this way cannot completely isolate the transmission of vibration. Especially with the increase of the power of the speaker unit, the improvement of the sound effect, and the enhancement of the bass sound effect, the effect of the traditional cushioning sleeve design on reducing vibration is not significant.

SUMMARY OF THE INVENTION

In view of the above problems, the present invention is to provide a speaker module and an electronic device, which can effectively reduce the amount of vibration transmitted from the speaker to the device casing, thereby avoiding problems such as resonance or image jitter.

To achieve the above purpose, the present invention is to provide a speaker module. The speaker module includes a device casing and a speaker. The speaker module also includes a fixing structure and a cushion unit. The fixing structure includes a first fixing part, a second fixing part, and a third fixing part. The first fixing part is fixedly disposed on the device casing. The second fixing part is fixedly connected with the speaker. The cushion unit includes a cushion body and a plurality of positioning protrusions. The cushion body has a through hole, a first end surface, and a second end surface opposite to the first end surface. The through hole runs through from the first end surface to the second end surface. The positioning protrusions are disposed on the second end surface. Therein, the speaker is fixedly connected to the cushion body through the second fixing part. The third fixing part passes through the through hole along a first direction from the first end surface to connect with the first fixing part. The second end surface laps a third end surface of the first fixing part. A space is formed between the positioning protrusions. The space encloses the first fixing part to limit the first fixing part in a radial direction perpendicular to the first direction. The third end surface of the first fixing part faces the second end surface of the cushion body. The cushion body blocks direct contact between the first fixing part and the second fixing part.

As an optional technical solution, a height of each positioning protrusion is less than a height of the first fixing part.

As an optional technical solution, the third fixing part includes an abutting portion, a middle portion, and a fixing portion connected in sequence. The third fixing part passes through the through hole to be detachably connected with the first fixing part. The abutting portion is against the first end surface of the cushion body. There is a gap between the middle portion and an inner wall of the cushion body.

As an optional technical solution, a diameter of the fixing portion is less than a diameter of the middle portion. The third fixing part is detachably connected to the first fixing part through the fixing portion.

As an optional technical solution, an inwardly-protruding structure is formed along the radial direction on the inner wall of the cushion body near the second end surface. A first vertical projection of the middle portion on the third end surface is located inside a second vertical projection of an inner wall of the inwardly-protruding structure on the third end surface. There is no contact or overlap between the first vertical projection and the second vertical projection.

As an optional technical solution, an axial direction of the through hole is perpendicular to a sound output direction of the speaker and is parallel to the first direction.

As an optional technical solution, the positioning protrusions are evenly spaced in a circumferential direction of the second end surface. The positioning protrusions are elastic.

As an optional technical solution, the second fixing part has an installation hole. An annular connection groove is formed on an outer periphery of the cushion body. The cushion body is disposed in the installation hole through the annular connection groove.

As an optional technical solution, a first area of the through hole near the second end surface has a first hole diameter. An outer diameter of the third end surface of the first fixing part is greater than the first hole diameter of the through hole.

The present invention is also to provide an electronic device. The electronic device the speaker module as described above.

Compared with the prior art, through the special structural design, the present invention uses the cooperation between the cushion unit and the fixing structure to ensure that the hole of the cushion unit is centered. Besides, since the cushion body of the cushion unit is placed flat on the third end surface of the first fixing part, the problems such as resonance or image jitter caused by the speaker shifting and touching the first fixing part in the vibration can be effectively avoided. Moreover, the speaker module of the present invention has the advantages of simple structure, easy assembly and low cost.

These and other objectives of the present invention will no doubt become obvious to those of ordinary skill in the art after reading the following detailed description of the preferred embodiment that is illustrated in the various figures and drawings.

DETAILED DESCRIPTION

In the following description, it should be noted that the technical terms such as "center", "upper", "lower", "left", "right", "vertical", "horizontal", "inner", "outer", etc. that indicate orientations or positional relationships are based on the orientations or positional relationships shown in the figures. These terms are only used for the convenience of describing the present invention and simplifying the description, rather than indicating or implying that the referred device or element referred to must have a specific orientation, be constructed and operated in a specific orientation. Therefore, they should not be construed as limiting the present invention.

Figure 1:
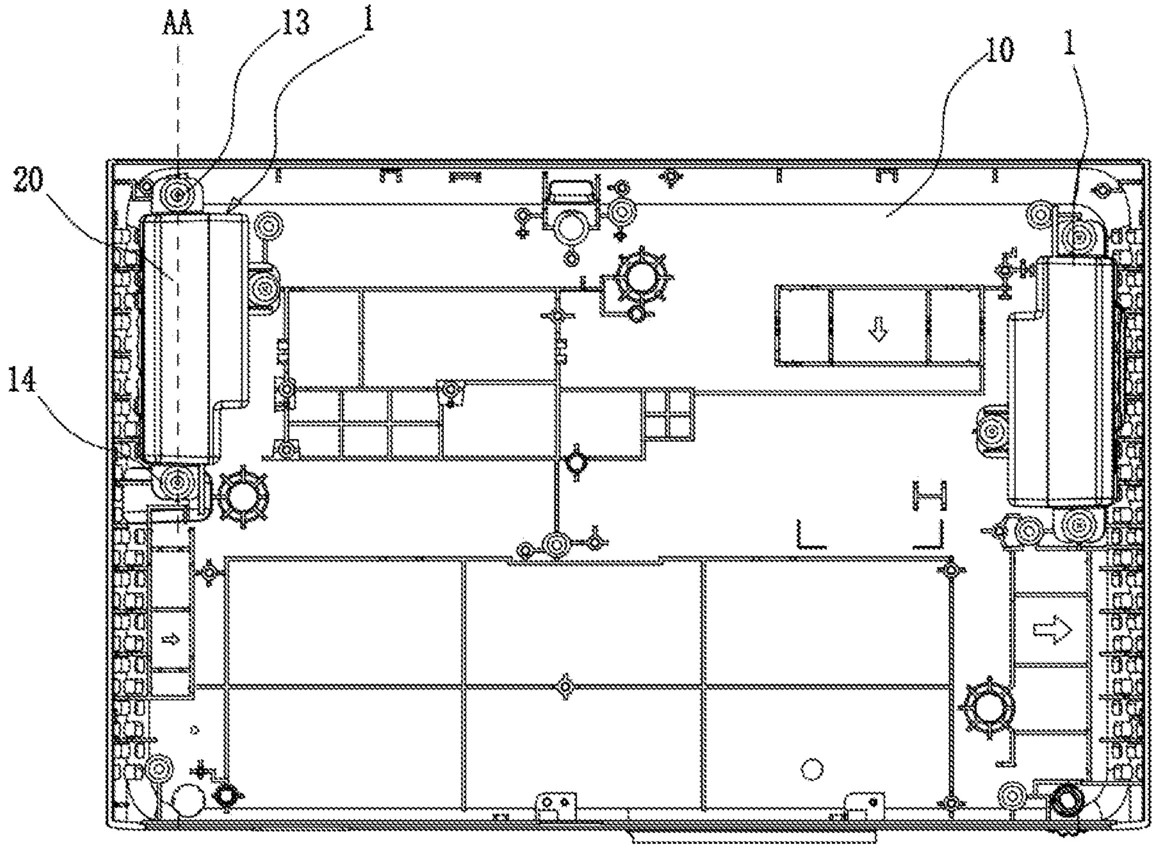
FIG. 1 is a schematic diagram illustrating an electronic device of an embodiment according to the invention.
Figure 2:
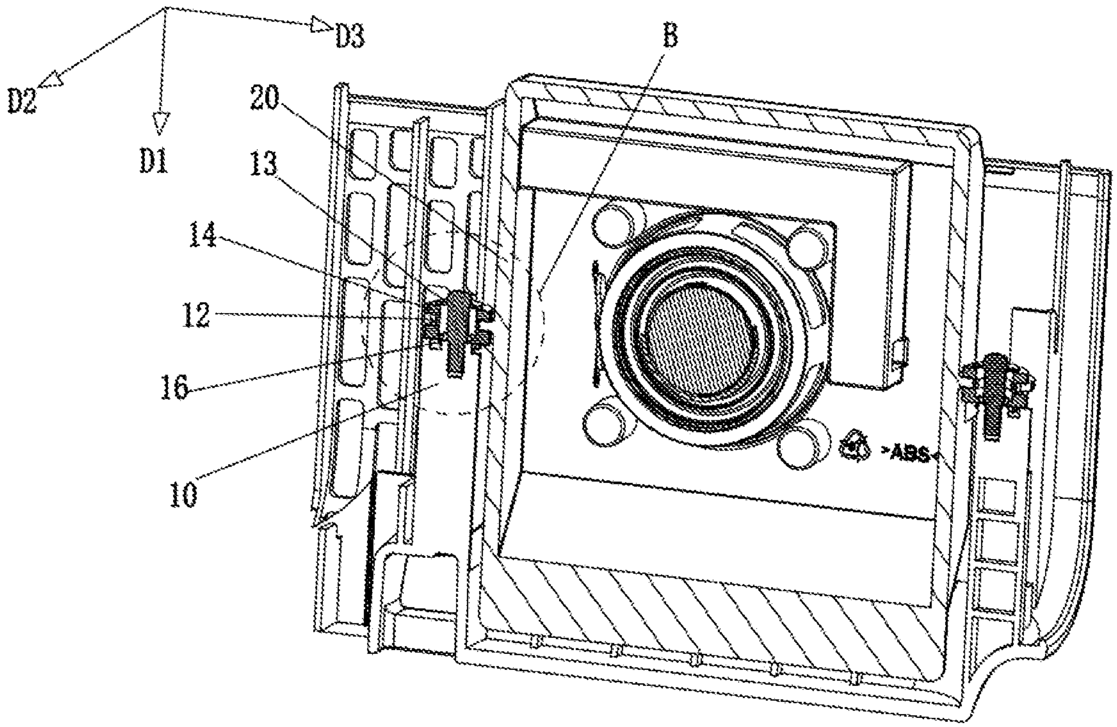
FIG. 2 is a sectional view along the line AA in FIG. 1.
Figure 3:
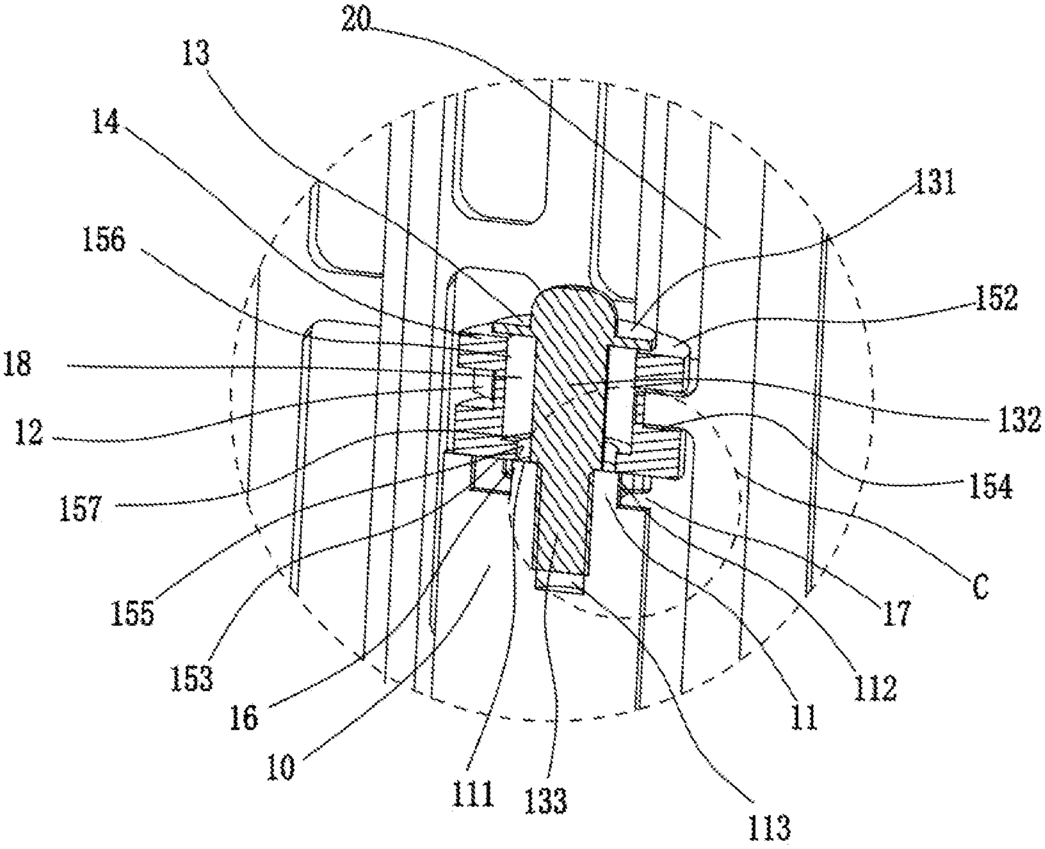
FIG. 3 is an enlarged view of the area B in FIG. 2.
Figure 4:
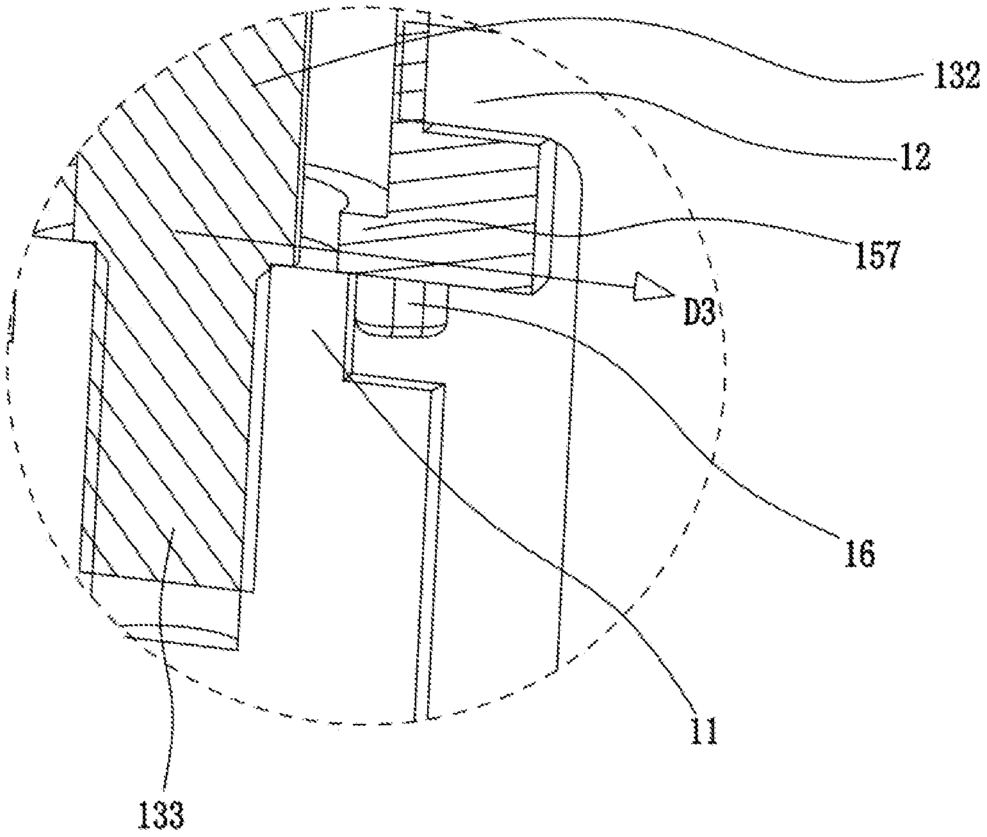
FIG. 4 is an enlarged view of the area C in FIG. 3.
Figure 5:
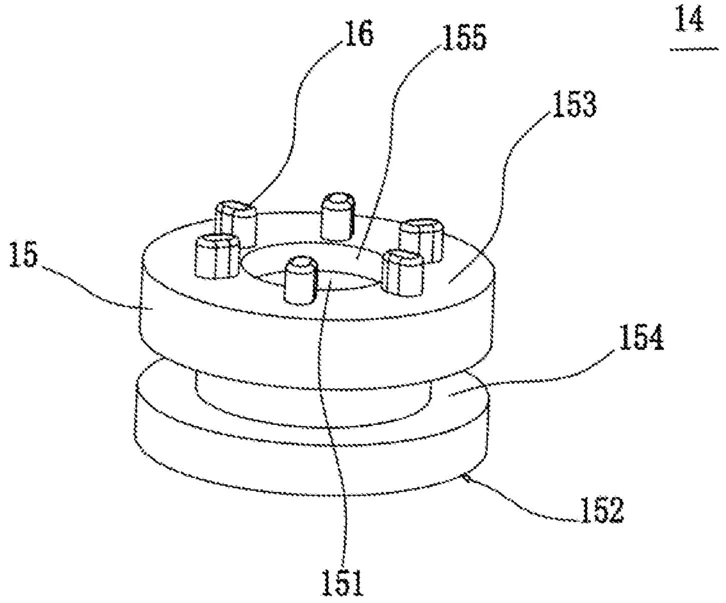
FIG. 5 is a schematic diagram illustrating a cushion unit of an embodiment according to the invention.

Please refer to FIG. 1 to FIG. 4. FIG. 1 is a schematic diagram illustrating an electronic device of an embodiment according to the invention. FIG. 2 is a sectional view along the line AA in FIG. 1. FIG. 3 is an enlarged view of the area B in FIG. 2. FIG. 4 is an enlarged view of the area C in FIG. 3. FIG. 5 is a schematic diagram illustrating a cushion unit of an embodiment according to the invention. An electronic device according to the present invention is provided. The electronic device has a speaker module 1 as described in the following. The speaker module 1 includes a device casing 10 and a speaker 20. The device casing 10 is a casing of the electronic device. Therein, the electronic device may be, for example but not limited to, a personal computer, a notebook computer, a stereo, a projector, a display, etc., which can emit sound through the speaker module 1. The number of speaker modules 1 installed in the electronic device can be determined according to actual usage requirements. As shown by FIG. 1, in the embodiment, one speaker module 1 is arranged on opposite sides of the electronic device. The speaker 20 is fixed on the device casing 10 by using the cooperation of a fixing structure with a cushion unit on both sides of each speaker module 1.

Therein, the speaker module 1 also includes a fixing structure and a cushion unit 14. The fixing structure includes a first fixing part 11, a second fixing part 12, and a third fixing part 13. The first fixing part 11 is fixedly disposed on the device casing 10. The second fixing part 12 is fixedly connected with the speaker 20. The cushion unit 14 includes a cushion body 15 and a plurality of positioning protrusions 16. The cushion body 15 has a through hole 151, a first end surface 152, and a second end surface 153 opposite to the first end surface 152. The through hole 151 runs through from the first end surface 152 to the second end surface 153. The positioning protrusions 16 are disposed on the second end surface 153.

Therein, the speaker 20 is fixedly connected to the cushion body 15 through the second fixing part 12. The third fixing part 13 passes through the through hole 151 along a first direction D1 from the first end surface 152 to detachably connect with the first fixing part 11. The second end surface 153 laps a third end surface 111 of the first fixing part 11. A space is formed between the positioning protrusions 16. The space encloses the first fixing part 11; that is, the positioning protrusion 16 surround an outer periphery 112 of the first fixing part 11, for limiting the movement of the first fixing part 11 in a radial direction D3 (as shown in FIG. 3) perpendicular to the first direction D1. The third end surface 111 of the first fixing part 11 faces the second end surface 153 of the cushion body 15. Thereby, the cushion body 15 can effectively blocks direct contact between the first fixing part 11 and the second fixing part 12. Moreover, according to the actual application situation, the positioning protrusions 16 can be configured to be close enough to the first fixing part 11 or keep a certain distance from the first fixing part 11, so as to better perform the limiting and fixing and not affect the cushion body 15 to effectively block direct contact between the fixing part 11 and the second fixing part 12.

Besides, in the embodiment, as shown by FIG. 2, a sound output direction D2 of the speaker 20 is perpendicular to an axial direction of the through hole 151. The first direction D1 is parallel to the axial direction of the through hole 151. In actual applications, the sound output direction D2 of the speaker 20 often corresponds to the opening orientation of the speaker or stereo in the electronic device. In general, the sound output direction D2 of the speaker 20 is the vibration direction of the speaker diaphragm.

In addition, the number of the positioning protrusions 16 is preferably determined to limit the first fixing part 11; for example, it can be 5 or 6. Specifically, the number can be determined according to actual conditions. Furthermore, preferably, a height of each positioning protrusion 16 is less than a height of the first fixing part 11 protruding from the device casing 10; that is, as shown by FIG. 3, after the fixing structure is assembled with the cushion unit 14, there is a gap 17 between the positioning protrusions 16 and the device casing 10, which shows that the positioning protrusions 16 will not directly touch the device casing 10 in the first direction D1 (i.e. the axial direction). This is because in this embodiment, the positioning protrusions 16 play the role of positioning the first fixing part 11, and the positioning protrusions 16 will not directly touch the device casing 10 (including the first fixing part 11). So, even if the speaker 20 vibrates, the vibration will not be transmitted to the device casing 10 via the positioning protrusions 16. In addition, preferably, the positioning protrusions 16 are evenly spaced in a circumferential direction of the second end surface 153, so that the first fixing part 11 can be more firmly limited. Moreover, preferably, the positioning protrusion 16 may be, for example, elastic positioning protrusions.

In the embodiment, the first fixing part 11 may be, for example, integrated with the device casing 10 to form a one-piece structure. However, the present invention is not limited thereto. In other embodiments, the first fixing part 11 can also be fixed on the device casing 10 by other fixing parts.

In addition, the second fixing part 12 may be a portion extended from the speaker 20, or may be fixed on the speaker 20 through other fixing parts. Moreover, the second fixing part 12 also has an installation hole; correspondingly, an annular connection groove 154 (as shown in FIG. 5) is formed on an outer periphery of the cushion body 15. The cushion body 15 is disposed in the installation hole by the annular connection groove 154.

Besides, preferably, in order to have a cushioning effect, the cushion unit 14 can be made of, for example, silicone, rubber or foam, or other elastic materials.

Please continue to refer to FIG. 3. In the embodiment, the third fixing part 13 includes an abutting portion 131, a middle portion 132, and a fixing portion 133 connected in sequence. The third fixing part 13 passes through the through hole 151 to be detachably connected with the first fixing part 11. The abutting portion 131 is against the first end surface 152 of the cushion body 15. There is a gap 18 between the middle portion 132 and an inner wall 156 of the cushion body 15. The fixing portion 133 is detachably connected to the first fixing part 11. Specifically, the third fixing part 13 is, for example, a step screw. The fixing portion 133 has a threaded structure. A corresponding center portion of the first fixing part 11 has an installation hole 113. The installation hole 113 is provided with a threaded structure for screwing with the threaded structure of the fixing portion 133. Moreover, since the gap 18 exists between the middle portion 132 and the inner wall 156 of the cushion body 15, that is, the third fixing part 13 will not directly touch the inner wall 156 of the cushion body 15 of the cushion unit 14, so the vibration of the speaker 20 will be reduce or prevented from being transmitted to the device casing 10 through the third fixing part 13 as much as possible. Besides, a diameter of the fixing portion 133 is less than a diameter of the middle portion 132, so that as long as the fixing portion 133 is fixedly connected with the first fixing part 11, the hole of the cushion unit 14 can be kept centered.

In addition, a first area 155 of the through hole 151 near the second end surface 153 (in which the first area 155 is actually a portion of the through hole 151) has a first hole diameter. An outer diameter of the third end surface 111 of the first fixing part 11 is greater than the first hole diameter of the through hole 151. In other words, a vertical projection of an inner wall of the first area 155 forming the through hole 151 on the third end surface 111 of the first fixing part 11 is located within the third end surface 111. Further, as shown by FIG. 3, an inwardly-protruding structure 157 is formed along the radial direction D3 on the inner wall 156 of the cushion body 15 near the second end surface 153. The inwardly-protruding structure 157 is disposed near the second end surface 153 and defines the first area 155; that is, the inner diameter of the inwardly-protruding structure 157 is the first hole diameter of the first area 155. Moreover, in the embodiment, the gap 18 exists between the middle portion 132 of the third fixing part 13 and the inner wall 156 of the cushion body 15; similarly, there is a gap between the inner wall of the inwardly-protruding structure 157 and the middle portion 132. In other words, a first vertical projection of the middle portion 132 on the third end surface 111 is located inside a second vertical projection of the inner wall of the inwardly-protruding structure 157 on the third end surface 111. There is no contact or overlap between the first vertical projection and the second vertical projection. Please continue to refer to FIG. 3. The first hole diameter of the first area 155 is less than the outer diameter of the third end surface 111, which ensures that the second end surface 153 of the cushion body 15 can be placed flat on the third end surface 111 of first fixing part 11. Besides, the gap 18 exists between the middle portion 132 of the third fixing part 13 and the inner wall 156 of the cushion body 15, and the sound output direction of the speaker 20 is perpendicular to the axial direction of the through hole 151. Such configuration prevents the speaker 20 from directly interacting with the first fixing part 11 in the vibration direction of the speaker diaphragm, so that the problems can be effectively avoided that resonance or image jitter caused by the speaker 20 shifting and touching the first fixing part 11 in the vibration.

Please continue to refer to FIG. 4. After the third fixing part 13 is assembled with the first fixing part 11, starting from the middle portion 132, along the radial direction D3, there are the middle portion 132, the inwardly-protruding structure 157 and the second fixing part 12 in sequence. Since there are gaps between the middle portion 132 and the inwardly-protruding structure 157 and between the middle portion 132 and the inner wall 156 of the cushion body 15, the vibration of the speaker 20 will not be directly transmitted to the first fixing part 11, but will be transmitted to the cushion body 15 through the second fixing part 12 and be absorbed by the cushion body 15 first. Moreover, starting from the fixing portion 133, along the radial direction D3, there are the fixing portion 133, the first fixing portion 11, the positioning protrusion 16, and the second fixing part 12 in sequence. The cushion body 15 laps the third end surface 111 of the first fixing part 11, so that the first fixing part 11 can achieve the precise positioning and centering through the positioning protrusions 16, and the positioning protrusions 16 connected to the second end surface of the cushion body 15 will not be completely in close contact with the first fixing part 11. Thereby, the cushion body 15 can effectively block direct contact between the first fixing part 11 and the second fixing part 12 in the radial direction D3, improving the cushioning effect.

That is, in the speaker module 1 of the present invention, through the above configuration, the cushion body 15 of the cushion unit 14 is limited between the abutting portion 131 of the third fixing part 13 and the third end surface 111 of the first fixing part 11, the first fixing part 11 is limited between the positioning protrusions 16 on the cushion unit 14, there is no direct contact between the cushion body 15 and the fixing portion 133 and the middle portion 132 of the third fixing part 13, and the positioning protrusions 16 on cushion unit 14 are not in direct contact with the device casing 10, so that the vibration generated by the speaker 20 will not be directly transmitted to the device casing 10, but will be mostly absorbed by the cushion unit 14 while the probability of the vibration being transmitted to the device casing 10 will be reduced.

As discussed above, through the special structural design, the present invention uses the cooperation between the cushion unit and the fixing structure to ensure that the hole of the cushion unit is centered. Besides, since the cushion body of the cushion unit is placed flat on the third end surface of the first fixing part, the problems such as resonance or image jitter caused by the speaker shifting and touching the first fixing part in the vibration can be effectively avoided. Moreover, the speaker module of the present invention has the advantages of simple structure, easy assembly and low cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A speaker module, comprising:

a device casing;

a speaker;

a fixing structure, the fixing structure comprising a first fixing part, a second fixing part, and a third fixing part, the first fixing part being fixedly disposed on the device casing, the second fixing part being fixedly connected with the speaker; and a cushion unit, the cushion unit comprising a cushion body and a plurality of positioning protrusions, the cushion body having a through hole, a first end surface, and a second end surface opposite to the first end surface, the through hole running through from the first end surface to the second end surface, the positioning protrusions being disposed on the second end surface;

wherein the speaker is fixedly connected to the cushion body through the second fixing part, the third fixing part passes through the through hole along a first direction from the first end surface to connect with the first fixing part, the second end surface laps a third end surface of the first fixing part, a space is formed between the positioning protrusions, the space encloses the first fixing part to limit the first fixing part in a radial direction perpendicular to the first direction, the third end surface of the first fixing part faces the second end surface of the cushion body, and the cushion body blocks direct contact between the first fixing part and the second fixing part;

wherein an inwardly-protruding structure is formed along the radial direction on an inner wall of the cushion body near the second end surface, a first vertical projection of a portion of the third fixing part located in the through hole on the third end surface is located inside a second vertical projection of an inner wall of the inwardly-protruding structure on the third end surface, and there is no contact or overlap between the first vertical projection and the second vertical projection.

2. The speaker module according to claim 1, wherein a height of each positioning protrusion is less than a height of the first fixing part.

3. The speaker module according to claim 1, wherein the third fixing part comprises an abutting portion, a middle portion, and a fixing portion connected in sequence, the third fixing part passes through the through hole to be detachably connected with the first fixing part, the abutting portion is against the first end surface of the cushion body, and there is a gap between the middle portion and the inner wall of the cushion body.

4. The speaker module according to claim 3, wherein a diameter of the fixing portion is less than a diameter of the middle portion, and the third fixing part is detachably connected to the first fixing part through the fixing portion.

5. The speaker module according to claim 1, wherein an axial direction of the through hole is perpendicular to a sound output direction of the speaker and is parallel to the first direction.

6. The speaker module according to claim 1, wherein the positioning protrusions are evenly spaced in a circumferential direction of the second end surface, and the positioning protrusions are elastic.

7. The speaker module according to claim 1, wherein the second fixing part has an installation hole, an annular connection groove is formed on an outer periphery of the cushion body, and the cushion body is disposed in the installation hole through the annular connection groove.

8. The speaker module according to claim 1, wherein a first area of the through hole near the second end surface has a first hole diameter, and an outer diameter of the third end surface of the first fixing part is greater than the first hole diameter of the through hole.

9. An electronic device comprising:

a speaker module, comprising:

a device casing;

a speaker;

a fixing structure, the fixing structure comprising a first fixing part, a second fixing part, and a third fixing part, the first fixing part being fixedly disposed on the device casing, the second fixing part being fixedly connected with the speaker; and a cushion unit, the cushion unit comprising a cushion body and a plurality of positioning protrusions, the cushion body having a through hole, a first end surface, and a second end surface opposite to the first end surface, the through hole running through from the first end surface to the second end surface, the positioning protrusions being disposed on the second end surface;

wherein the speaker is fixedly connected to the cushion body through the second fixing part, the third fixing part passes through the through hole along a first direction from the first end surface to connect with the first fixing part, the second end surface laps a third end surface of the first fixing part, a space is formed between the positioning protrusions, the space encloses the first fixing part to limit the first fixing part in a radial direction perpendicular to the first direction, the third end surface of the first fixing part faces the second end surface of the cushion body, and the cushion body blocks direct contact between the first fixing part and the second fixing part;

wherein an inwardly-protruding structure is formed along the radial direction on an inner wall of the cushion body near the second end surface, a first vertical projection of a portion of the third fixing part located in the through hole on the third end surface is located inside a second vertical projection of an inner wall of the inwardly-protruding structure on the third end surface, and there is no contact or overlap between the first vertical projection and the second vertical projection.

10. The electronic device according to claim 9, wherein a height of each positioning protrusion is less than a height of the first fixing part.

11. The electronic device according to claim 9, wherein the third fixing part comprises an abutting portion, a middle portion, and a fixing portion connected in sequence, the third fixing part passes through the through hole to be detachably connected with the first fixing part, the abutting portion is against the first end surface of the cushion body, and there is a gap between the middle portion and the inner wall of the cushion body.

12. The electronic device according to claim 11, wherein a diameter of the fixing portion is less than a diameter of the middle portion, and the third fixing part is detachably connected to the first fixing part through the fixing portion.

13. The electronic device according to claim 9, wherein an axial direction of the through hole is perpendicular to a sound output direction of the speaker and is parallel to the first direction.

14. The electronic device according to claim 9, wherein the positioning protrusions are evenly spaced in a circumferential direction of the second end surface, and the positioning protrusions are elastic.

15. The electronic device according to claim 9, wherein the second fixing part has an installation hole, an annular connection groove is formed on an outer periphery of the cushion body, and the cushion body is disposed in the installation hole through the annular connection groove.

16. The electronic device according to claim 9, wherein a first area of the through hole near the second end surface has a first hole diameter, and an outer diameter of the third end surface of the first fixing part is greater than the first hole diameter of the through hole.

* * * * *